June 6, 1961 L. F. MARCANELLO 2,987,092
ANTISKID DEVICE
Filed June 25, 1959
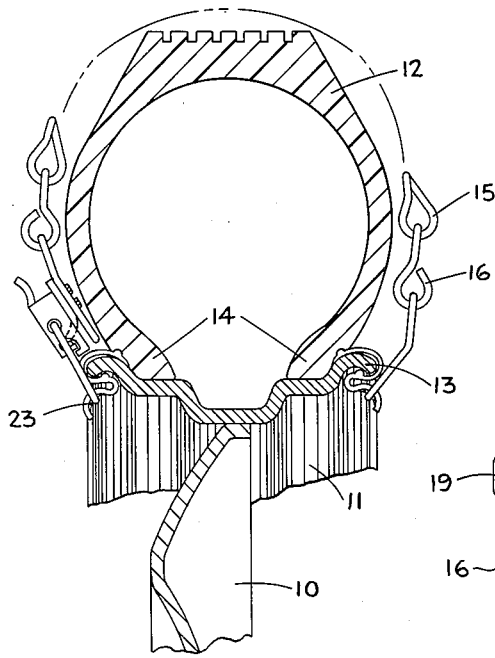
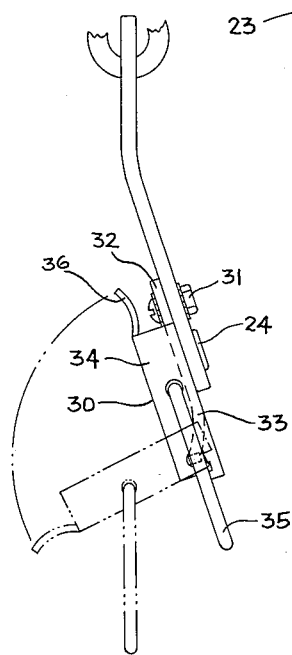
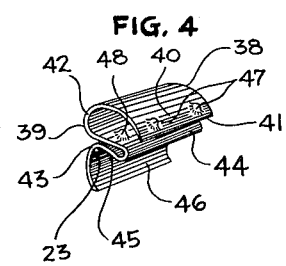
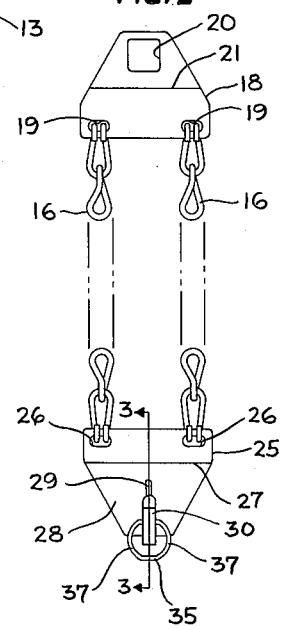
INVENTOR.
BY Louis F. Marcanello
Robert K. Youtie
Attorney

United States Patent Office 2,987,092
Patented June 6, 1961

2,987,092
ANTISKID DEVICE
Louis F. Marcanello, 526 W. Fisher Ave.,
Philadelphia 20, Pa.
Filed June 25, 1959, Ser. No. 822,919
2 Claims. (Cl. 152—233)

This invention relates generally to antiskid devices for vehicle wheels, and is especially concerned with means for mounting such devices on the wheels without jacking up the vehicle.

It is one object of the present invention to provide an antiskid device of the type described which is adapted to be more quickly and easily attached to and removed from a vehicle wheel without the use of any tools or the exercise of more than average skill, and without requiring undue physical exertion or contortion.

It is another object of the present invention to provide an antiskid mounting device having the advantageous characteristics mentioned in the preceding paragraph which is extremely durable and reliable in use, and which can be economically manufactured for sale at a reasonable cost.

It is a more particular object of the present invention to provide a novel lug-element construction for attachment to conventional vehicle wheels to facilitate the mounting thereon of antiskid chains and the like.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a partial sectional view through a vehicle wheel showing an antiskid device of the present invention in operative association with the wheel;

FIGURE 2 is a plan view showing an antiskid device of the present invention in operative condition apart from a wheel;

FIGURE 3 is an enlarged partial sectional view taken substantially along the line 3—3 of FIGURE 2, and showing in phantom an alternative position of certain elements thereof; and FIGURE 4 is a perspective view showing a lug element of the present invention apart from the remainder thereof.

Referring now more particularly to the drawings, and specifically to FIGURE 1 thereof, there is illustrated therein a vehicle wheel, generally designated 10, having a peripheral rim 11, and about the exterior of which extends a penumatic tire 12.

The rim 11 may be conventional and is provided on each side with a circumferentially extending outstanding flange or edge portion 13. Inward of each edge portion 13 seats a respective bead 14 of the peripherally extending tire 12. The structure thus far described is conventional.

The antiskid device of the present invention is generally designated 15 and includes a pair of elongate flexible or articulate traction elements 16, which may be chains, as illustrated. The elongate traction elements extend in side-by-side, or parallel spaced relation as seen in FIGURE 2, and transversely across the outer periphery of the tire 12, as seen in FIGURE 1.

At one adjacent pair of ends of the traction elements 16 is provided a connector 18. The connector may be fabricated of stiff plate stock, preferably having one end provided with a pair of laterally spaced openings 19 for the respective reception of the end links of chains 16. Thus, one end of the connector plate is connected to one adjacent pair of ends of the chains 16. The other end of the connector plate 18, remote from the chains 16, is provided with a through opening 20, which may be rectangular, as illustrated, and located along a center line laterally medially between the chains 16. The connector 18 is preferably bent along a line 21 to dispose its opposite end regions at an obtuse angle with respect to each other, as best seen in FIGURE 1; and, the connector plate may taper toward its end having the aperture 20, in the direction away from the chains 16.

Connected to the other adjacent pair of ends of chains 16, the lower ends as seen in FIGURE 2, is an additional connector or plate 25 which is also provided at one end with a pair of laterally spaced through openings 26 respectively receiving the adjacent end links of the traction chains 16. The connector plate 25 is bent obliquely along a laterally extending line 27 and extends therefrom to define an outwardly tapering end region 28. The end region 28 is formed with a through slot 29 extending along a center line disposed longitudinally of and medially between the longitudinal directions of the traction chains 16. A locking device, generally designated 30, is secured to the tapering outer-end region 28 of the plate 25, as by fasteners 31 and 24 extending through the slot 29. The fasteners 31 and 24 may be of a conventional type, such as nuts and bolts or rivets, and are releasable for securing the locking device 30 at a selected position of adjustment longitudinally of the slot 29.

In FIGURE 3 is shown an enlarged side view of the draw-up lock 30. This lock includes a mounting member or plate 32 fixedly secured in facing engagement with the connector plate 25 by the fasteners 31 and selectively adjustable longitudinally of the slot 29, as mentioned hereinbefore. Extending longitudinally outward from the plate 32 beyond the connector 25, and curving outward therefrom, is an extension 33. A lever 34 overlies the extension 33 and plate 32, as seen in solid lines in FIGURE 3, and has its lower end pivotally connected to the distal end of the extension 33 for swinging movement between the solid-line position and the dot-and-dash-outline position. A finger piece or actuating member 36 may project from the end of lever 34 remote from the pivotal connection thereof to the extension 33. An engaging member or loop 35 is pivotally connected to the lever 34 at a location thereof spaced from its pivotal connection to the extension 33. If desired, the engaging member or loop 35 may have arcuate, outwardly bowed side portions 37, as seen in FIGURE 2.

It will now be appreciated that the engaging member or loop 35 is movable inward toward the connector 25 upon swinging movement of the lever 34 toward its solid-line position, and that the engaging loop is movable outward away from the connecting member upon swinging movement of the lever away from the connecting member.

The lug element of FIGURE 4 is generally designated 38 and may be formed integrally of a single sheet or plate of relatively stiff material. In particular, the lug element 38 may be formed of plate stock and bent to define a clip 39 of generally U-shaped cross section having one side or leg 40 terminating at its free end in a relatively sharp lip 41. From the bight or bend region 42 of the U-shaped clip 39, its other side or leg 43 extends in spaced relation beneath the leg 40 and terminates in a reverse bend 44. From the reverse bend, closely underlying the clip side portion 43, extends an intermediate portion 45 which terminates proximate to and beneath the bight region 42 of the clip. Depending integrally from the outer region of the intermediate portion 45, beneath the bight region 42, is an extension or main body portion 46. The clip 39 may be provided on its upper or outer side 40 with a plurality of outwardly upset portions or protrusions 47, and is preferably provided on its lower side or leg 43, interiorly of the clip with additional upset portions or protrusions 48.

In use, the lug element 38 is arranged as shown in FIGURE 1, the clip 39 being snap-engaged over the flange or edge 13 of the rim 11, with the lip 41 entering snugly between the rim and tire 12. Attachment of the lug elements 38 may be facilitated by deflating, or partially deflating the tire 12. Upon inflation of the tire, the protrusions 47 will conformably engage in the tire surface for positive retention therein, and also the protrusions 48 further insure positive retention of the lug elements on the wheel by engagement beneath the rim flange 13. In this manner, the lug elements are fixedly secured in position on the wheel, and the extension or main body portion 46 of each lug element extends generally radially inward of the wheel from the edge of the rim.

With the lug elements 38 in position as shown in FIGURE 1, the antiskid device may be arranged to engage the connector 18 over one of the lug elements, the right-hand lug element as seen in FIGURE 1, with the main body portion or extension 46 extending through the opening 20 of the connector 18. The traction chains 16 are then extended from the connector 18 transversely across the periphery of the tire to the other side thereof. With the locking mechanism 30 extended, as in the phantom position of FIGURE 3, the engaging member or loop 35 is interengaged about the extension or main body portion 46 of the adjacent lug element 38, and the operating lever 34 swung toward the mounting plate 32 to draw up and tighten the loop 35 about the lug element. Of course, the mounting plate 32 of the locking mechanism 30 is properly adjusted relative to the connector plate 25 to insure tight locking action. If desired, resilient padding 23, such as rubber, may be provided interiorly between and at the juncture of the intermediate portion 45 and extension 46 of each lug element for engagement with the connector 18 and engaging loop 35.

As the lever 34 in its locking position is swung beyond dead center, it is understood that any shock or pull exerted on the chains 16 will not unlock the locking mechanism, and that the latter may be unlocked only by deliberate positive manual action.

Of course, removal of the chains 16 may be quickly and easily effected by mere reversal of the above-described procedure, namely opening or unlocking the locking mechanism 30 to remove the engaging member 35 from its lug element, and removing the connector 18 from its lug element, and withdrawing the chain from about the tire. The lug elements 38 may, of course, remain in position on the wheel at all times, thereby being present for emergency use when needed.

From the foregoing, it is seen that the present invention provides an antiskid device which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

This application is a continuation in part of my prior copending patent application Serial No. 761,718, filed September 18, 1958, now abandoned.

What is claimed is:

1. An antiskid device for attachment to a wheel having a rim and a tire extending peripherally about the rim, said device comprising a pair of lug elements adapted to be located on opposite sides of said rim, each lug element including a U-shaped portion embracingly engageable about the edge of the rim with one end entering between the tire and the radial outer side of the rim and the other end engaging the radial inner side of the rim, a reversely bent intermediate portion extending from said other end of said U-shaped portion laterally outward generally toward said rim edge, and an extension extending from the laterally outer end of said intermediate portion radially inward of said rim, flexible elongate traction means adapted to extend transversely across the periphery of said tire, a connector on one end of said traction means removably engaged over the extension of one of said lug elements, and a draw-up lock on the other end of said traction means releasably secured to the extension of the other of said lug elements, said draw-up lock comprising an operating lever pivoted at one end, means connecting said operating lever to the other end of said traction means for adjustment longitudinally of said traction means, and an engaging member pivotally connected at one end to said lever at a location spaced from said one end of the latter and having its other end configured for interengagement with said other lug element, said engaging member being movable away from said other lug element for detachment from the latter when said lever is swung in one direction and said engaging member being movable toward said other lug element for tight securement thereto when said lever is swung in the other direction.

2. An antiskid device according to claim 1, said engaging member comprising a loop loosely engageable about said other lug element when said lever is swung in said one direction and forcibly engaged against said other lug element when said lever is swung in the other direction.

References Cited in the file of this patent

UNITED STATES PATENTS

| | | |
|---|---|---|
| 1,194,433 | Silberman | Aug. 15, 1916 |
| 1,618,161 | Allemang | Feb. 22, 1927 |
| 2,020,586 | Stetson | Nov. 12, 1935 |
| 2,224,879 | Nagle et al. | Dec. 17, 1940 |
| 2,461,267 | Givens | Feb. 8, 1949 |
| 2,528,203 | Zwosta | Oct. 31, 1950 |
| 2,663,061 | Zarth | Dec. 22, 1953 |
| 2,675,845 | Donaldson | Apr. 20, 1954 |